A. H. DARKER.
DYNAMO.
APPLICATION FILED OCT. 10, 1917.

1,268,330.

Patented June 4, 1918.
6 SHEETS—SHEET 1.

A. H. DARKER.
DYNAMO.
APPLICATION FILED OCT. 10, 1917.

1,268,330.

Patented June 4, 1918.
6 SHEETS—SHEET 2.

Inventor
Alfred Henry Darker
by attys

A. H. DARKER.
DYNAMO.
APPLICATION FILED OCT. 10, 1917.

1,268,330.

Patented June 4, 1918.
6 SHEETS—SHEET 6.

Inventor
Alfred Henry Darker
by attys

UNITED STATES PATENT OFFICE.

ALFRED HENRY DARKER, OF LONDON, ENGLAND, ASSIGNOR TO J. STONE & COMPANY LIMITED, OF DEPTFORD, ENGLAND.

DYNAMO.

1,268,330.	Specification of Letters Patent.	Patented June 4, 1918.

Application filed October 10, 1917. Serial No. 195,894.

*To all whom it may concern:*

Be it known that I, ALFRED HENRY DARKER, a subject of the King of Great Britain and Ireland, residing at the Langham Hotel, Portland Place, London, England, have invented certain new and useful Improvements in Dynamos, of which the following is a specification.

This invention relates to brush and terminal contact mechanism of dynamo electric machines, especially such as are used for the lighting of railway and similar vehicles, and which are consequently driven sometimes in one direction and sometimes in the other.

One object of the present invention is to provide, in connection with the brush rocker a contact mechanism comprising engaging parts capable of rocking one in the other while maintaining efficient electrical contact in all positions of the parts. Such an arrangement permits of effectually employing the shifting of the brushes on the commutator, during reversal, for the maintenance of the constant polarity of the dynamo.

Another object of the invention is to provide rocking contact mechanism capable of maintaining good and efficient engagement between the contact parts in all circumstances, and to provide self-cleaning contact parts, and nevertheless to avoid offering appreciable or considerable resistance to turning, which is of importance when the said turning is effected by the frictional engagement of the brushes with the commutator.

A further object is the adaptation of brush and terminal contact of the kind referred to for the changing, interchanging or reversing of circuit connections whenever the contact parts are rocked from one limit position to the other. The principal advantage to be obtained in achieving this object is the utilizing of the mechanism in question for the changing over of batteries in double battery systems, which changing-over usually necessitates the provision of a separately energized mechanism.

Yet another object is that of enabling brush and contact mechanism suitable for use on a constant speed dynamo, such as a plain shunt wound machine driven by a slipping belt, to be readily adapted, in a simple manner, for use on a variable speed self-regulating dynamo in which a subsidiary brush or brushes is or are employed.

A specific object, therefore, is to combine, with a rocker having the improved contact mechanism, a subsidiary commutator brush gear, whereby the turning of the rocker, for reversal of the main brushes, carries the subsidiary brushes into engagement with appropriate contacts. The contacts made in connection with the subsidiary brushes may be those of the field winding of a variable speed dynamo.

The invention, lastly has for its object to avoid the use of flexible connections between the brush holders and fixed terminals of the dynamo and to provide a simple arrangement possessing a longer life and greater reliability than has been possible heretofore with flexible connections.

The foregoing, together with such other objects as may hereinafter appear, or are incident to the present invention, are obtained by means of constructions illustrated in preferred form in the accompanying drawings, wherein.

Figure 1:
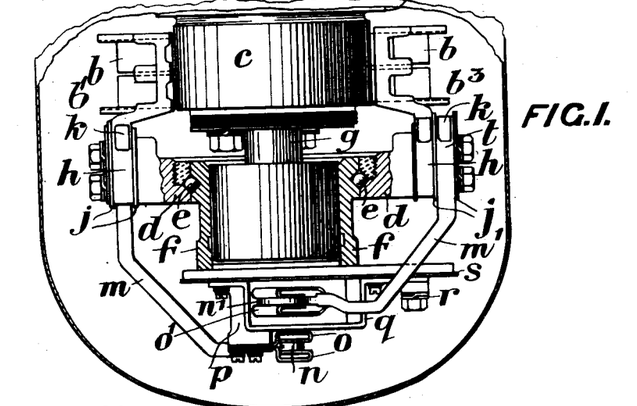
Figure 1 is a plan, partly in horizontal section of the commutator end of a four pole dynamo and showing the commutator, spindle bearing, brush rocker and a contact mechanism constructed in accordance with these improvements.
Figure 2:
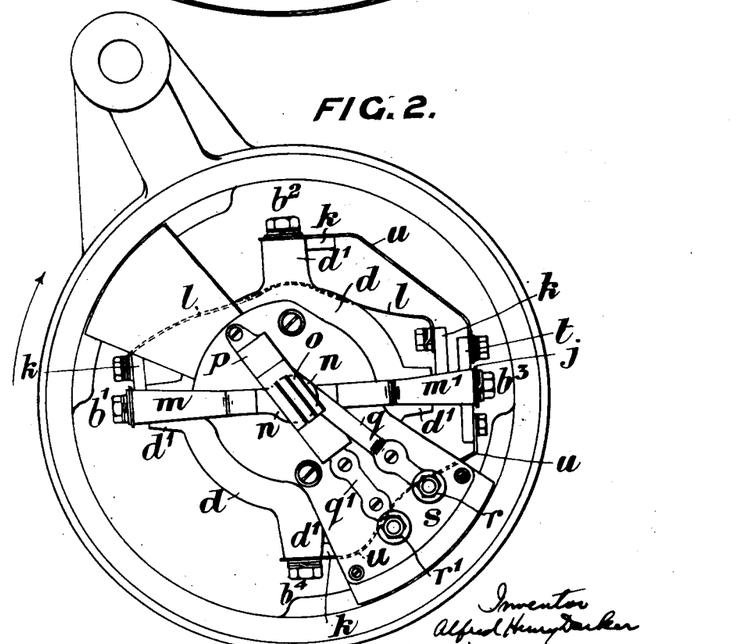
Fig. 2 is a more or less diagrammatic end elevation of the commutator end of the dynamo seen in Fig. 1, the four brushes of which are connected in pairs each pair being connected with a contact arm of the improved contact mechanism.

Referring to Fig. 1 of the drawings, $a$ is the armature, $b$ are the brushes, and $c$ is the commutator. The four brushes are carried by their respective brush holders which may be of any suitable type and of which no description need be given, as the present improvements are not concerned with the particular type of holder employed. In Fig. 1, two of the brush holders are seen, namely $b'$ and $b^3$. In Fig. 2 the brush holders are not seen but in the position to which they are rocked when the dynamo runs in the direction indicated by the arrow they would be opposite the points $b'$ $b^2$ $b^3$ $b^4$. The four brush holders are mounted upon a rocker comprising a ring $d$ which is carried by a ball bearing $e$ on the exterior of the bearing sleeve $f$ in which runs the end $g$ of the armature spindle. One method of mounting the holders $b^1$ to $b^4$ consists in providing each with an extension $h$ which is bolted to an appropriate projection $d'$ on the periphery of the ring $d$, the extensions $h$ being insulated by mica or suitable material $j$. Each extension $h$ has an ear or lug $k$ and the holders $b'$ $b^3$ are connected as a pair by means of the copper strip $l$, Fig. 2, which is fastened by screws or studs to the ears or lugs $k$ on the extensions $h$ of such holders $b'$ $b^3$. The extension $h$ of the brush holder $b'$ is formed with an arm $m$ which extends in the axial direction beyond the end of the spindle and is then bent radially inward toward the axis, or is fitted with a radial arm. The end of the arm $m$, which may be suitably shaped as a disk at $n$, is received between, and gripped by, a pair of centrally situated spring blade contacts $o$, mounted upon a bracket $p$, a bowed strip $q$ connecting the bracket with a terminal $r$ of the dynamo. The bracket $p$ is secured upon a terminal board $s$, of suitable insulating material, suitably mounted at the outer end of the bearing sleeve $f$.

Outside of the extension $h$ of the brush holder $b^3$ is secured a plate $t$, which is insulated from the said extension by insulation $j$, as seen clearly in Fig. 1, and this plate $t$ is connected by means of copper strips $u$, Fig. 2, with the ears or lugs $k$ appertaining to the brush holders $b^2$ $b^4$, so that these latter are connected as a pair. The plate $t$ is formed with an arm $m'$ similar to the arm $m$ aforesaid, and the end $n'$ of the arm $m'$ is received and gripped between spring contacts $o'$ arranged behind the contacts $o$ aforesaid and within the bow of the strip $q$. The contacts $o'$ are mounted on one end of a strip $q'$ which connects the contacts $o'$ with the other terminal $r'$ of the dynamo.

It will be seen therefore that the ends $n$ $n'$ of the arms $m$ $m'$ are capable of turning in the contacts $o$ $o'$, after the manner of pivotal connections having the axes of the pivots coinciding with the axis of the armature spindle. As the arms $m$ $m'$ have only to rock through an angle of about 90°, when the direction of runnings is reversed, this amplitude of movement is possible without the arms $m$ $m'$ encountering any obstruction. The ring $d$ is rocked in one direction or the other, according to the direction of running, by reason of the frictional engagement of the brushes $b$ with the commutator $c$, or if desired, by means of electrical or mechanical clutch parts, and suitable stops are provided, as usual, for limiting the rocking motion in either direction so as to properly position the brushes $b$. As the frictional engagement between the ends $n$ $n'$ of the arms $m$ $m'$ and the contacts $o$ $o'$ occurs between such small areas situated at the center of revolution, relatively little resistance is offered to the turning movement produced by the engagement of the brushes $b$ with the commutator, the diameter of which latter is relatively large compared with the diameters of the ends $n$ $n'$, or by the engagement of suitable clutch parts. As the ends $n$ $n'$ of the arms are in constant gripping engagement with the contacts $o$ $o'$ the circuit is never broken, and the contact surfaces are practically never exposed to any extent, and are self cleaning.

Figure 3:
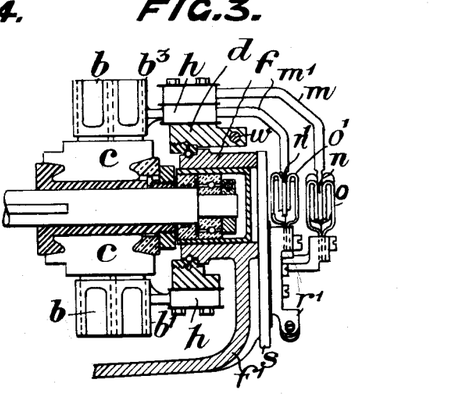
Fig. 3 is a longitudinal sectional elevation of the commutator and contact parts as modified for use with a two pole two brush dynamo, the brushes and contact parts being seen in this figure as when turned 90° from either of the limit positions.
Figure 4:
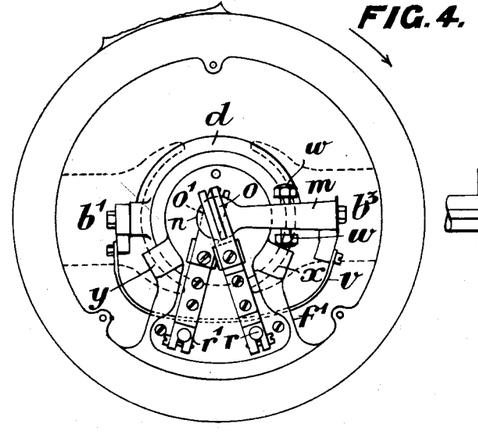
Fig. 4 is a more or less diagrammatic end view of Fig. 3 the parts being shown in the limit position to which they are rocked when the dynamo runs in the direction of the arrow.

In the modification illustrated in Figs. 3 and 4, there are only two brush holders $b'$ $b^3$ 180° apart, the dynamo being a two pole machine in which the brushes $b$ must be capable of rocking through about 180° upon reversal of the direction of running. The brush holders are not seen in Fig. 4 but the positions, for the direction of running indicated by the arrow, are opposite the reference characters $b'$ $b^3$. The brush holders are mounted by means of extensions $h$ upon the rocker ring $d$, and in the case of the holder $b^3$ the extension $h$ is formed with a bent contact arm $m'$ the end $n'$ of which is received and gripped by the centrally situated spring contacts $o'$. Now if, upon reversal, the holder $b^3$ is rocked through about 180° in the direction opposite to that indicated by the arrow Fig. 4, so as to exchange positions with the holder $b'$, it will be clear that the extension $h$ of the holder $b'$ cannot be fitted with a contact arm, as in the case of the holder $b^3$, because such arm would encounter the supporting bracket $f'$ of the bearing sleeve $f$. Therefore, a contact arm $m$ is mounted outside of, but insulated from, the arm $m'$, and is electrically connected with the extension $h$ of the holder $b'$ by means of the copper strip $v$. The end $n$ of the arm $m$ is received and gripped by the centrally situated spring contact $o$. The contacts $o$ $o'$ are mounted upon a suitable terminal board $s$ and connected with appropriate dynamo terminals $r$ $r'$ in any convenient manner. The arrangement above described permits the free unobstructed movement of the arms $m$ $m'$ through about 180° in the direction aforesaid, upon the direction of running being reversed. A suitable means of arresting the ring $d$ in either of the limit positions consist of small bolts $w$ screwed into a projection on the ring and adapted to strike against either the projection $x$ or $y$ on the framing according to the direction of running.

In the case of a three brush dynamo, in which there are two main brushes and one subsidiary brush, a third arm similar to the arms $m$ $m'$ and a third contact similar to the contacts $o$ $o'$ may be added and suitable connections made, the subsidiary brush being suitably connected to the third arm as will be readily understood. If two subsidiary brushes be used, as is the case in some machines, a fourth arm could be added. Also, if the subsidiary brush or brushes is or are rocked, upon reversal, through a different angle from that through which the main brushes are rocked, the subsidiary brush holder or holders may be mounted upon a separate rocker and the contact arms appertaining to the subsidiary brush or brushes would be carried by this second rocker, as will be readily understood.

Figure 5:
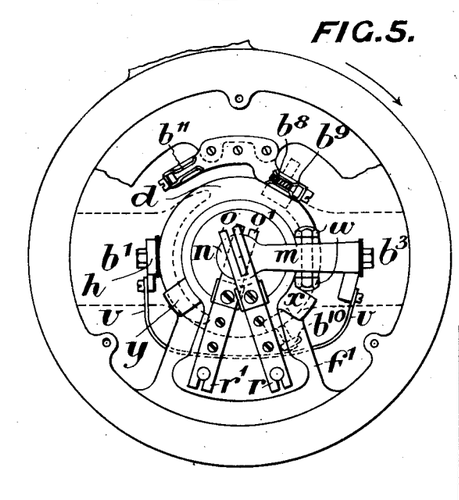
Fig. 5 is a view similar to Fig. 4 of a modification adapted for use with a three brush dynamo, the subsidiary brush holder being indicated only in dotted lines in order that two fixed contacts may both be seen clearly.
Figure 6:
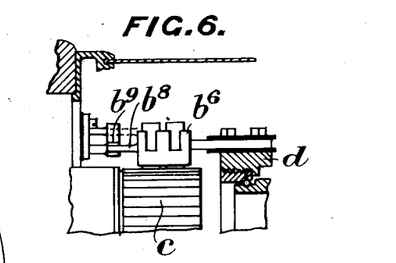
Fig. 6 is a longitudinal sectional elevation of a fragment of the commutator end of a dynamo showing particularly the contact devices for the subsidiary brushes.
Figure 7:
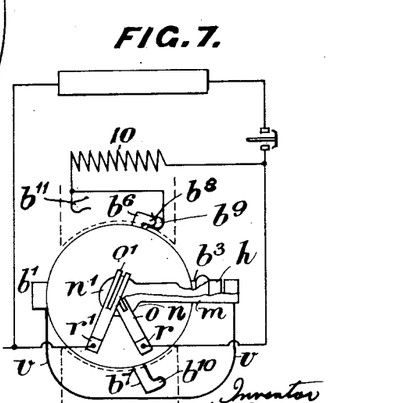
Fig. 7 is a diagram explanatory of the working of the arrangement illustrated in Figs. 5 and 6.

In the case of a subsidiary brush dynamo, however, the third arm may be dispensed with, as seen in Figs. 5 to 7, which illustrate an arrangement similar to that in Figs. 3 and 4, but with subsidiary brushes in holders $b^6$ $b^7$ supported upon the ring $d$ by means of extension pieces which are bolted to, but insulated from, the ring $d$, as seen in Fig. 6. Only one of the subsidiary brushes is in action at one and the same time and these brushes are supported upon the ring $d$ in such positions that when either of them is in action, according to the direction of running, it is correctly placed in relation with the main brushes. The brush holder $b^6$ has a projecting contact $b^8$ adapted for engaging with a fixed fork contact $b^9$ in the direction of running indicated by the arrow in Fig. 5. The brush holder $b^7$ is provided with a similar projecting contact $b^{10}$ adapted for engaging a fixed fork contact $b^{11}$ which is situated a little farther from the center than the contact $b^9$. Therefore when the brushes rock through 180° from the position seen in Figs. 5 and 7 in the reverse direction to that indicated by the arrow, the projection $b^8$ passes out of engagement with the contact $b^9$ and then beneath the contact $b^{11}$ and finally the projecting contact $b^{10}$ on the holder $b^7$ comes into engagement with the fixed contact $b^{11}$. As will be seen from Fig. 7, one terminal of the field winding 10 of the dynamo is connected to, say, the negative main of the installation which is connected with the contact $o$. The latter is in contact with the disk $n$ on the end of the arm $m$ which is connected by the strip conductor $v$ with the negative brush holder $b'$. The other terminal of the field winding 10 is connected to the two fixed contacts $b^9$ and $b^{11}$. Conseqeuently, in the direction of running indicated by the arrow, the field winding 10 is connected between the negative brush holder $b'$ and the subsidiary brush holder $b^6$ in advance in the direction of revolution. The dynamo poles indicated in Fig. 7 are shifted around through 90° as compared with Fig. 5 so as to give the conventional disposition of the main brush between the poles. In the reverse direction of rotation the negative brush holder $b'$ will be brought around to the position in which the brush holder $b^3$ is seen and the subsidiary brush holder $b^7$ will engage by its projecting contact $b^{10}$ with the fixed contact $b^{11}$, so that, in this reverse direction of running, the field winding 10 will still be connected between the negative brush holder and a subsidiary brush holder in advance thereof. This arrangement enables a position to be determined for the intermediate brush which gives a wider or less span than 90° on the commutator as may be desired, so that a very fine adjustment and varied output curve can be obtained. With this arrangement, the subsidiary brush which is in action in one direction of running may have the same angle of advance as the subsidiary brush which is active in the opposite direction of running, or it may have a different angle of advance according to whether or not the conditions are the same in the two directions of running. The subsidiary brush, which for the time being is idle, is very close to the neutral line, so that it does not have any adverse influence such as it would have if it were in a position to short circuit active conductors. For a four pole dynamo a similar arrangement could be readily devised possessing similar advantages. It will thus be seen that only very simple modifications are required for changing a shunt wound dynamo, suitable for being driven by a slipping belt, into a self-regulating dynamo which may be driven so as to partake of all the speed variations of the driving axle.

Figure 8:
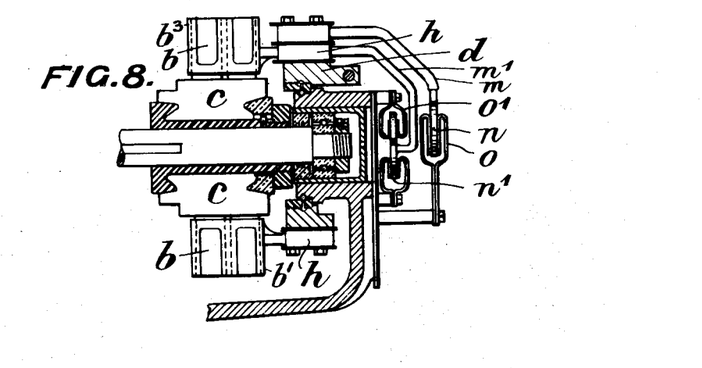
Fig. 8 is a view similar to Fig. 3 of a further modification.
Figure 9:
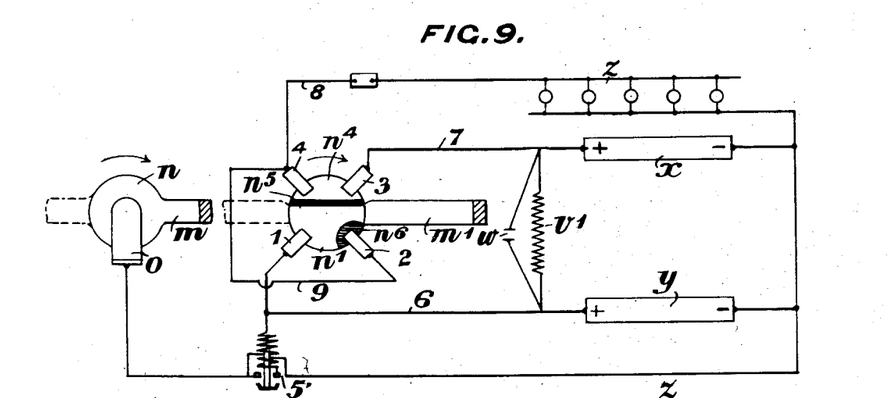
Fig. 9 is a diagram illustrating the different connections made by an arrangement in which the contact devices, such as are seen in Fig. 8, are employed for changing over the circuit connections of the batteries in a double battery installation when the movable parts are rocked through 180°, as in the case of a two-brush two-pole dynamo.
Figure 10:
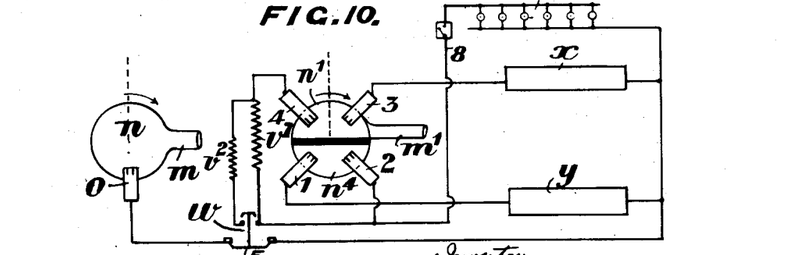
Fig. 10 is a diagram illustrating a modification of the arrangement seen in Fig. 9.

When an installation comprises two batteries, as in Figs. 9 and 10, it is necessary, for well-known reasons, to interchange, from time to time, the connections of the batteries $x$ and $y$, and this may be accomplished by means of an adaptation of the improved mechanism hereinbefore described. For example, and as illustrated in Figs. 8 and 9, the contact end of the arm $m'$, which is assumed to be in connection with the positive brush of the dynamo, is adapted for engaging with a number of contacts as hereinafter explained. The end $n$ of the arm $m$, which is connected with the negative brush, need only engage with a single contact $o$ as before. The disk end $n'$ of the arm $m'$, is offset from the said arm $m'$ and is composed of two portions $n'$ and $n^4$ separated by insulation $n^5$, the portion $n'$ being integral with the arm $m'$ and the portion $n^4$ being completely insulated. In the portion $n'$ there is an inset of insulation $n^6$, Fig. 9, or, of course, a suitable gap may be cut in the portion $n'$. Around this disk-shaped end of the arm $m'$ are four fixed contacts 1, 2, 3 and 4 which constantly engage with the disk after the manner of the contacts $o$ and $o'$ above described. The contact 1 is connected with the positive lead to the battery $y$; the contact 2 is connected with the contact 4 by a conductor 9; the contact 3 is connected with the positive to the battery $x$ and the contact 4 is connected with the lighting circuit $z$. The usual lamp resistance $v'$ is connected between the positive terminals of the batteries $x$ and $y$, and any suitable means are provided for short circuiting this resistance at $w$ when the dynamo speed falls below a predetermined minimum, in the well-known manner. An electro-magnetic main circuit closer is shown at 5 and needs no further description as it may be of any well-known kind and may be adapted for closing the short circuit at $w$ when it opens the main circuit, also in the well-known manner.

When the direction of revolution is that indicated by the arrow, the arms $m$ $m'$ occupy the positions seen in full lines, in Fig. 9, this figure being diagrammatic and showing the arm $m'$ removed from behind the arm $m$. In this position of the parts, current from the positive brush passes through the arm $m'$ to the disk portion $n'$ and into contact 1. The contact 2 is on the insulation $n^6$ and makes no circuit. Consequently, the said current passes from contact 1 through the conductor 6, a part going into the battery $y$ to charge the latter, and a part flowing through the resistance $v'$, conductor 7, contact 3, disk portion $n^4$, contact 4 and conductor 8 to the lamps. Under these conditions, the battery $x$ may at times receive a slight charge and at other times may slightly discharge to assist the dynamo in supplying the lamps, and a battery so connected is said to be floating. When the direction of revolution is reversed, so that the arms $m$ $m'$ are turned through 180° to the dotted position, the disks on the ends of the arms turning in respective contacts, the disk portion $n'$ engages the contact 3 so that the battery $x$ is directly supplied with charging current. The insulation $n^6$ is opposite the contact 4 so that the latter makes no circuit. The disk portion $n^4$ connects the contacts 1 and 2, so that some current from the conductor 7 passes through the resistance $v'$ to the conductor 6, through contact 1, disk portion $n^4$, contact 2, conductor 9, contact 4, and conductor 8 to the lamps. The battery $y$ is now floating, and it will be seen, therefore, that the reversal of the rocking parts effects a change-over of the battery connections in the desired manner.

In the modification illustrated in Fig. 10 which is particularly adapted for a four pole dynamo, the disk part $n'$ on the arm $m'$ when the direction of revolution is that indicated by the arrow, is in position for making connection between the arm $m'$ and the fixed contacts 3 and 4. This means that current from the positive brush of the dynamo, passing through the arm $m'$ and arriving at the disk part $n'$ divides into two parts, one part passing through the fixed contact 3 to the battery $x$ and the other part passing through the contact 4 resistance $v'$ and conductor 8 to the lamps. At times a little of the current in the conductor 8 will flow through the contact 2, disk portion $n^4$ and contact 1 to the floating battery $y$, while at other times a little current will flow reversely from the battery $y$, to assist in supplying the lamps. In the reverse direction of running the arms $m$ $m'$ turn through 90° only to the vertical positions indicated by the vertical dotted lines in Fig. 10. In this position, the disk portion $n'$ will touch the fixed contacts 4 and 1, so that the battery $y$ will then be directly charged and the lamps will receive current through the resistance $v'$. The disk portion $n^4$ being then in contact with 3 and 2, the battery $x$ will be floating and may take in or give out a little current by way of conductor 8, contact 2, disk portion $n^4$, and contact 3. In Fig. 10 when the main circuit closing switch 5 opens, it closes a subsidiary switch at $w$ and connects a small resistance $v^2$ in parallel with the resistance $v'$.

Figures 11, 12, 13:
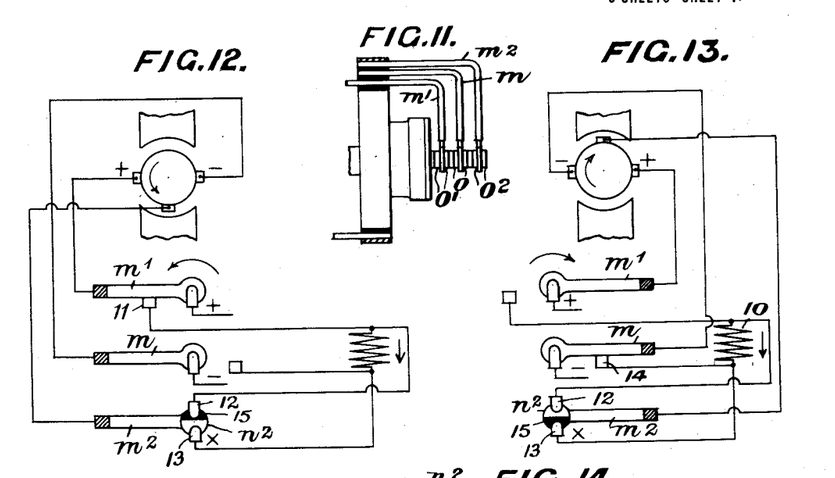
Fig. 11 is a sectional view illustrating the addition of a third contact arm for use in a three brush dynamo of a known type.
Figs. 12 and 13 are diagrammatic views illustrating an adaptation of the contact arrangements seen in Fig. 11 for producing the field circuit connections in a three brush dynamo in opposite directions of running.

Fig. 11 shows an arrangement in which a third arm $m^2$ is mounted upon the rocker and is connected with a subsidiary brush in the same manner as the arms $m$ $m'$ are connected with the main brush holders as above described. Now in some self-regulating dynamos, a main field winding 10, Fig. 12, is connected, in the direction of running indicated by the arrow, between the positive brush and the subsidiary brush in advance of the positive brush, but, upon reversing the direction of running, the brushes take up the position seen in Fig. 13, and in order that the same effect may be obtained as in the direction of running in Fig. 12, the winding 10 must be connected between the negative brush and the subsidiary brush, because the latter is now in advance of the negative brush having regard to the direction of revolution indicated by the arrow.

In order to accomplish this, one terminal of the winding 10 is connected to a fixed contact 11 which is engaged by the arm $m'$ in one extreme position of the arms, as seen in Fig. 12, and the opposite terminal of the field winding 10 is connected to a fixed contact 14 which is engaged by the arm $m$ in the other extreme position of the arms, as seen in Fig. 13. Contacts 12 and 13 are arranged to grip a disk on the end of the arm $m^2$, which disk is offset as in the case of the disk on the arm $m'$ in Figs. 8 and 9. One portion of the disk is of insulation, as indicated by the shaded area 15, and the other portion $n^2$ may be integral with the arm $m^2$ so that in either of the extreme positions of the arms, the arm $m^2$ is in electrical contact with either the contact 12, or the contact 13, according to the direction of revolution. That terminal of the winding 10 which is connected to the contact 11 is also connected to the contact 12, and the opposite terminal is connected to the contact 13. In the direction of running indicated in Fig. 12, the arm $m'$ is in engagement with the fixed contact 11, and the contact 13 is on the metal portion $n^2$ of the disk on the arm $m^2$ so that the winding 10 is connected between the positive and subsidiary brushes, the contact 12 being on the insulation of the said disk. In the opposite direction of running indicated in Fig. 13, the parts having turned through 180°, the arm $m$ is in engagement with the contact 14, contact 13 is on the insulation 15 and the contact 12 is now engaging the metal part $n^2$ of the disk so that the winding 10 is connected up between the negative and subsidiary brushes. Therefore, in either direction of running the flow of current through the field winding 10 will be in the same direction, as is indicated by the arrow placed near to the winding 10.

Figure 14:
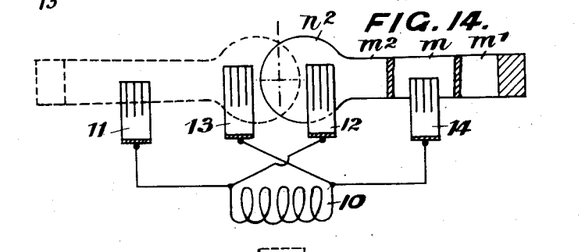
Figs. 14 and 15 illustrate further modifications of the arrangement seen in Figs. 11 to 13.
Figure 15:
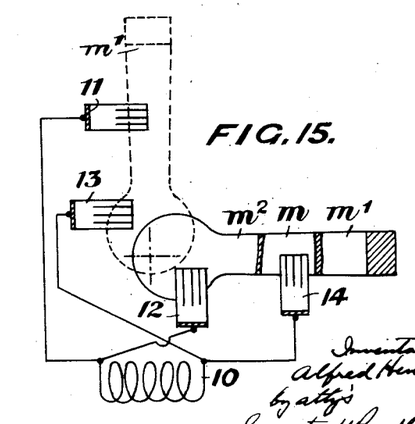

In the modification seen in Fig. 14, a disk $n^2$ on the end of the arm $m^2$ is eccentric to the axis of the armature spindle indicated by $+$. Therefore in the extreme position shown in full lines the disk $n^2$ will engage the contact 12 and in the opposite extreme position, indicated by dotted lines, the disk $n^2$ engages the contact 13 and not the contact 12. The contacts 11 and 14 are respectively set in the paths of the arms $m'$ and $m$, as was the case in Figs. 13 and 14. In Fig. 15 a similar arrangement is seen, excepting that the disposition of the contacts is modified to suit an angle of reversal of 90°, the two extreme positions of the arms being indicated by the full and dotted lines as before.

Figure 16:
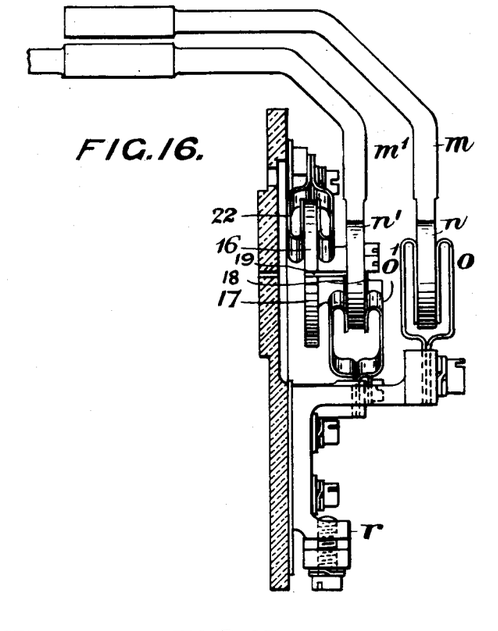
Fig. 16 is a sectional side elevation illustrating a further modification of the rocking contact devices or arms.
Figures 17, 18:
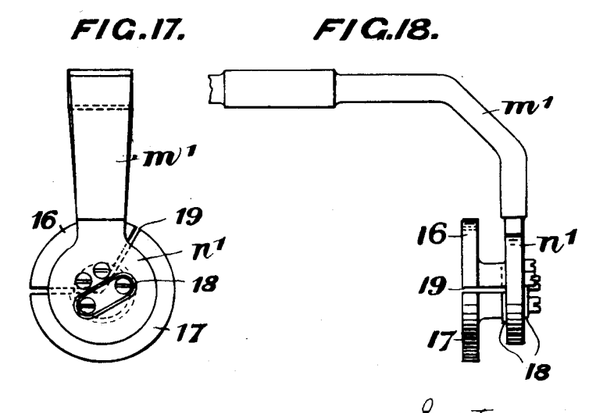
Fig. 17 is an end elevation and Fig. 18 is a side elevation of one of the contact devices seen in Fig. 16.

In the modification seen in Figs. 16 to 18, the contact disk $n'$ on the arm $m'$ engages a fixed contact $o'$ as before, but it is also fitted with off-set disk parts 16 and 17, the part 16 being connected by screws to the disk $n'$ so as to be in electrical connection therewith, and the part 17 being connected by screws but having insulation 18 interposed, so that the part 17 is completely isolated from the disk $n'$ and arm $m'$. The part 17, moreover, is insulated from the part 16 by an air gap 19, or by a layer of insulation, and is larger than the part 16, the peripheral arc of the latter being a little more than 90° and the peripheral arc of the part 17 being considerably more than 180°. The disk parts 16, 17 are in operative engagement with three fixed contacts 20, 21, and 22, connected respectively to terminals 23, 24 and 25 on the terminal board, the contact $o$ being connected to a terminal $r$ as before.

Figure 19:
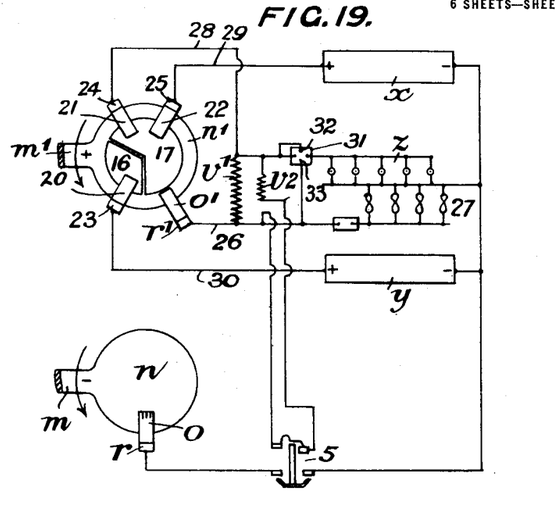
Fig. 19 is a diagram illustrating the operation of the parts seen in Figs. 16 to 18 and showing the parts in one extreme position.
Figures 20, 21:
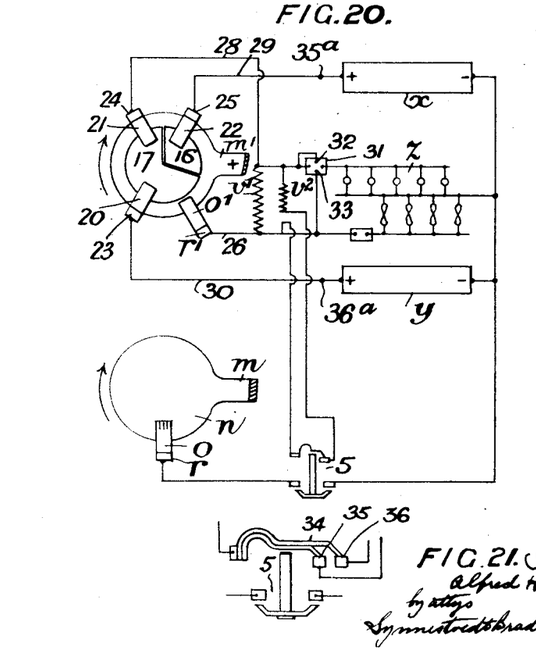
Fig. 20 is a diagram similar to Fig. 19 but showing the connections made when reversal takes place and the contact arms are shifted through 180°
Fig. 21 is a diagram illustrating a switch arrangement applicable to the installation shown in Figs. 19 and 20.

The operation of the parts illustrated in Figs. 16 to 18 is explained by the diagrams, Figs. 19 and 20. In Fig. 19, the revolution of the dynamo is indicated by the arrow as anti-clockwise. The negative main of the installation is connected to the contact $o$ engaging the disk $n$ of the arm $m$ and the paths for the current from the positive arm $m'$ will now be described. The disk $n'$ on the arm $m'$ is shown, in Figs. 19 and 20, as of larger diameter than the disk composed of the parts 16 and 17, simply for convenience in making up the diagram. Current passes from the disk $n'$ into the contact $o'$ and from the latter through the conductor 26 to the lower terminal of the lamp resistance $v'$, the conductor being continued to a fan motor circuit 27 if the installation comprises such motors in addition to lamps. Instead of, or in addition to, fans, electric heaters and other apparatus may be employed. The upper terminal of the resistance $v'$ is connected not only to the lamps $z$ through the lamps switch, but also by conductor 28 with the terminal 24 of the contact 21, so that the current also passes through 28, 24 and 21 to the insulated disk part 17 and through the latter to the contact 22, terminal 25, and conductor 29 to the battery $x$. Current from the disk $n'$ also passes into the disk part 16, through contact 20, terminal 23 and conductor 30 to the battery $y$. Thus the battery $y$ is directly charged by the dynamo current, whereas the battery $x$ is floating.

In the reverse or clockwise direction of running indicated in Fig. 20, the arms $m$ $m'$ and their contact disks have turned through 180°, and it will be seen that the terminal contact 22 of the battery $x$ is now in engagement with the disk part 16 so that charging current from the dynamo can pass directly to the battery $x$. The insulated disk part 17 now electrically connects the contacts 20 and 21, so that current from the disk $n'$ passes through the contact $o'$ terminal $r'$ conductor 26, and resistance $v'$ to the lamps $z$ and also from the upper terminal of the resistance $v'$ through conductor 28, terminal 24, contact 21, disk part 17, contact 20, terminal 23 and conductor 30 to the battery $y$. In this direction of running therefore, the battery $y$ is the floating battery. It will be observed that as the fan motor current is taken directly from the contact $o'$ in either direction of running the potential applied to the fan motors is always that of the positive brush of the dynamo. The main circuit closer 5 is adapted, when opening the main circuit, to connect a resistance $v^2$ in parallel with the resistance $v'$. The main lamp switch 31 has an additional contact 32 connected with the upper terminal the resistances $v'$ $v^2$ and an additional contact 33 connected with the conductor 26. In the "off" position of this lamp switch, the brush, or other switch device, connects the contacts 32 and 33 and thus short circuits the resistances.

According to Fig. 21, the core of the solenoid of the main circuit closer 5 is adapted to operate a double switch brush 34. This brush has its hinge end connected with the upper terminals of the resistances $v'$ $v^2$ and when the core of the solenoid falls to open the main circuit the brush 34 makes contact with two terminals 35, 36. These terminals are respectively connected to points 35ª and 36ª Fig. 20, in the conductors 29 and 30 respectively. Therefore, when the main circuit is opened at 5, the switch 34 makes connection between the conductors 29 and 30 and the upper terminal of the resistances $v'$ $v^2$ so that the batteries may then supply the lamps direct, no current having then to pass through the contact disk part 17. In order that the dynamo may be excited with full brush voltage, the field windings may be connected between the terminals $r$ and $r'$. Also the connections for the potential coil of the main circuit closing solenoid may be taken from these terminals.

I claim:—

1. Rocking terminal contact mechanism for dynamo electric machines comprising a rocking member, contact members mounted on said rocking member and extending toward the center of revolution, and fixedly mounted contacts adapted to engage the inner end of said contact members in such manner as to permit of the desired rocking movement thereof.

2. Rocking terminal contact mechanism for dynamos comprising a rocker, contact arms mounted on said rocker and extending toward the center of revolution, and fixedly and centrally mounted contacts adapted to engage the inner ends of said arms and permit of the desired rocking movement thereof.

3. Reversing brush gear for dynamo electric machines comprising a rocking support for commutator brush holders, conductor arms mounted on said support and connected with respective holders said arms having free ends extending toward the center of revolution, and fixedly mounted contacts adapted for engaging the inner ends of said arms and permitting of the desired amplitude of rocking motion thereof.

4. Reversing brush gear for dynamo electric machines comprising a rocking support for commutator brush holders, arms extending from respective holders toward the center of revolution, and fixedly mounted contacts in engagement with the inner ends of said arms at said center.

5. Reversing brush gear for dynamo electric machines comprising a rocking ring support, commutator brush holders, mounted around said ring, conductor arms extending from said holders away from the commutator and toward the center of revolution, and central fixed contacts adapted for engaging the inner ends of said arms while permitting the rocking movement thereof.

6. Reversing brush gear for dynamo electric machines comprising a rocking brush holder support, conductor arms connected with respective holders and extending to the center of revolution, said arms being arranged so that their free ends are one behind the other in the line of the axis of said spindle, and fixedly supported central contacts arranged one behind the other along said line and engaging with the inner ends of appropriate arms in such manner as to permit rocking movement thereof around said axis.

7. In a dynamo electric machine and in combination a rocking brush holder support, conductor arms extending from some of the brush holders on said support toward the center of revolution, fixed central contacts appropriately arranged for engaging the inner ends of respective arms, while permitting rocking motion of the latter projecting contacts on other brush holders, and fixedly mounted contacts adapted for engaging said projecting contacts in the limit positions of said rocking support.

8. In a dynamo electric machine and in combination a rocking brush holder support, conductor arms connected with respective holders and extending toward the center of revolution, disk shaped contact pieces on the ends of said arms, and fixedly supported central contacts engaging with respective disks in such manner as to permit rocking movement thereof around said axis.

9. Brush reversing and switching gear for dynamo electric machines comprising a rocking support, brush holders thereon, an arm extending from one of said holders and toward the center of revolution, a switch contact disk on the inner end of said arm, and a plurality of fixed contacts around the periphery of, and adapted to engage with, said disk, the partial revolution of said disk in relation to said contacts being adapted for performing switching operations.

10. Brush reversing and switching gear for dynamo electric machines comprising a rocking support, brush holders thereon, an arm extending from one of said holders and toward the center of revolution, a disk on the inner end of said arm said disk being partly of metal in electrical connection with said arm and partly of insulation, and a plurality of fixed contacts around said disk adapted to engage therewith, the partial revolution of said disk in relation to said contacts being adapted for making different circuit connections in one limit position from those which are made in the other limit position of the rocking support.

11. Brush reversing and switching gear for dynamo electric machines comprising a rocking support, brush holders thereon, an arm extending from one of said holders and toward the center of revolution, an offset disk on the inner end of said arm said offset disk being composed of two portions one of which is connected with and the other insulated from said arm, and a plurality of fixed contacts around each disk adapted to engage therewith.

12. Brush reversing and switching gear for dynamo electric machines comprising a rocking support, brush holders thereon, an arm extending from one of said holders and toward the center of revolution, said arm being formed at its inner end with a flattened disk portion, an off-set contact disk in two parts secured concentrically to said disk portion one of said parts being completely insulated, a fixed contact engaging the disk portion of the arm, and a plurality of contacts around the periphery of the two part disk substantially as set forth.

ALFRED HENRY DARKER.